(12) United States Patent
Huang

(10) Patent No.: US 8,817,852 B2
(45) Date of Patent: Aug. 26, 2014

(54) COMMUNICATION APPARATUSES AND RADIO FREQUENCY EQUALIZERS

(71) Applicant: Wistron NeWeb Corp., Hsinchu (TW)

(72) Inventor: Yao-Nan Huang, Hsinchu (TW)

(73) Assignee: Wistron Neweb Corp., Hsinchu (TW)

( * ) Notice: Subject to any disclaimer, the term of this patent is extended or adjusted under 35 U.S.C. 154(b) by 107 days.

(21) Appl. No.: 13/647,500

(22) Filed: Oct. 9, 2012

(65) Prior Publication Data

US 2013/0272350 A1   Oct. 17, 2013

(30) Foreign Application Priority Data

Apr. 17, 2012 (TW) .............................. 101113567 A

(51) Int. Cl.
*H04B 1/38* (2006.01)

(52) U.S. Cl.
USPC ............. 375/219; 375/211; 375/232; 455/76; 455/78; 455/126; 455/127.1

(58) Field of Classification Search
CPC ........... H04N 21/47202; H04N 21/482; H04B 1/0475
USPC .................. 375/219, 232; 455/126, 127.1, 76
See application file for complete search history.

(56) References Cited

U.S. PATENT DOCUMENTS

| 6,118,984 | A | * | 9/2000 | Yu-Hong | ......................... 455/76 |
| 6,549,087 | B1 | | 4/2003 | Hoang et al. | |
| 7,248,845 | B2 | * | 7/2007 | Dunn | .......................... 455/127.1 |
| 8,649,418 | B1 | * | 2/2014 | Negus et al. | ................... 375/211 |
| 2002/0190811 | A1 | * | 12/2002 | Sperber | ....................... 333/28 R |
| 2005/0181749 | A1 | * | 8/2005 | Lee | ................. 455/126 |
| 2007/0211747 | A1 | * | 9/2007 | Kim | .............................. 370/437 |
| 2009/0316826 | A1 | | 12/2009 | Koren et al. | |
| 2010/0048146 | A1 | * | 2/2010 | McCallister | .................... 455/78 |
| 2013/0272350 | A1 | * | 10/2013 | Huang | ........................... 375/219 |

\* cited by examiner

*Primary Examiner* — Eva Puente
(74) *Attorney, Agent, or Firm* — McClure, Qualey & Rodack, LLP

(57) ABSTRACT

A radio frequency equalizer includes a first resistor coupled to an input terminal, a second resistor coupled between the first resistor and an output terminal, a first capacitor, a first inductor, a first switch coupled to the input terminal, the first capacitor and the first inductor, a second switch coupled to the output terminal, the first capacitor and the first inductor, a second capacitor, a second inductor and a third switch coupled to the first resistor, the second resistor, the second capacitor and the second inductor. According to a control signal, the first switch selectively couples the first capacitor or the first inductor to the input terminal, the second switch selectively couples the first capacitor or the first inductor to the output terminal and the third switch selectively couples the second capacitor or the second inductor to the first resistor and the second resistor.

15 Claims, 7 Drawing Sheets

COMMUNICATION APPARATUSES AND RADIO FREQUENCY EQUALIZERS

CROSS REFERENCE TO RELATED APPLICATIONS

This application claims priority of Taiwan Patent Application No. 101113567, filed on Apr. 17, 2012, the entirety of which is incorporated by reference herein.

BACKGROUND OF THE INVENTION

1. Field of the Invention

The invention relates to a radio frequency (RF) equalizer, and more particularly, to an RF equalizer capable of compensating for unflatness of the output RF signal power.

2. Description of the Related Art

Due to mobile communications technology advancements in recent years, various communications services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the Global System for Mobile communications (GSM) technology, the Code Division Multiple Access (CDMA) technology, the Wideband Code Division Multiple Access (WCDMA) technology, and the Long Term Evolution (LTE) technology, etc. In addition, a major enhancement of LTE technology is LTE Advanced technology.

In order to support multiple communications technologies (for example, the GSM, CDMA, WCDMA, LET . . . etc.) from a single mobile device, multi-mode mobile devices have become common. Since the operation bands are different for different communications technologies, the multi-mode mobile device must support a wide range of frequency bands so as to sufficiently cover all of the different communications technologies operation bands. For example, the multi-mode mobile device should support frequency bands from 0.7 GHz to 3 GHz.

However, due to some electronic characteristics of the electronic devices utilized in mobile devices, there may be some fluctuations in the output signal power of RF signals after being processed by the mobile devices, causing unflatness of the output RF signal power in operation bands. FIG. 1a shows an exemplary curve of output RF signal power versus frequency. In the example, the output RF signal power decreases as frequency increases. FIG. 1b shows another exemplary curve of output RF signal power versus frequency. In the example, the output RF signal power increases as frequency increases, where the increment or decrement in the signal power is a phenomenon of the unflatness of the output RF signal power.

In order to solve the unflatness of the output RF signal power, RF equalizers capable of compensating for unflatness of the output RF signal power are provided.

BRIEF SUMMARY OF THE INVENTION

A communications apparatus and radio frequency (RF) equalizers are provided. An exemplary embodiment of a communications apparatus comprises an RF transceiver, an RF equalizer, a power amplifier and a duplexer. The RF transceiver receives a plurality of baseband signals and generates a plurality of RF signals. The RF equalizer is coupled to the RF transceiver, receives the RF signals and generates a plurality of equalized RF signals according to a control signal. The power amplifier is coupled to the RF equalizer, receives the equalized RF signals and amplifies the equalized RF signals to generate a plurality of amplified RF signals. The duplexer is coupled to the power amplifier, receives the amplified RF signals and passes the amplified RF signals to an antenna. A frequency response of the RF equalizer is adjustable in response to the control signal.

An exemplary embodiment of an RF equalizer for receiving a plurality of RF signals and generating a plurality of equalized RF signals according to a control signal comprises a first resistor coupled to an input terminal, a second resistor coupled between the first resistor and an output terminal, a first capacitor, a first inductor, a first switch coupled to the input terminal, the first capacitor and the first inductor, a second switch coupled to the output terminal, the first capacitor and the first inductor, a second capacitor, a second inductor, and a third switch coupled to the first resistor, the second resistor, the second capacitor and the second inductor. The first switch selectively couples the first capacitor or the first inductor to the input terminal according to the control signal. The second switch selectively couples the first capacitor or the first inductor to the output terminal according to the control signal. The third switch selectively couples the second capacitor or the second inductor to a connection node of the first resistor and the second resistor according to the control signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
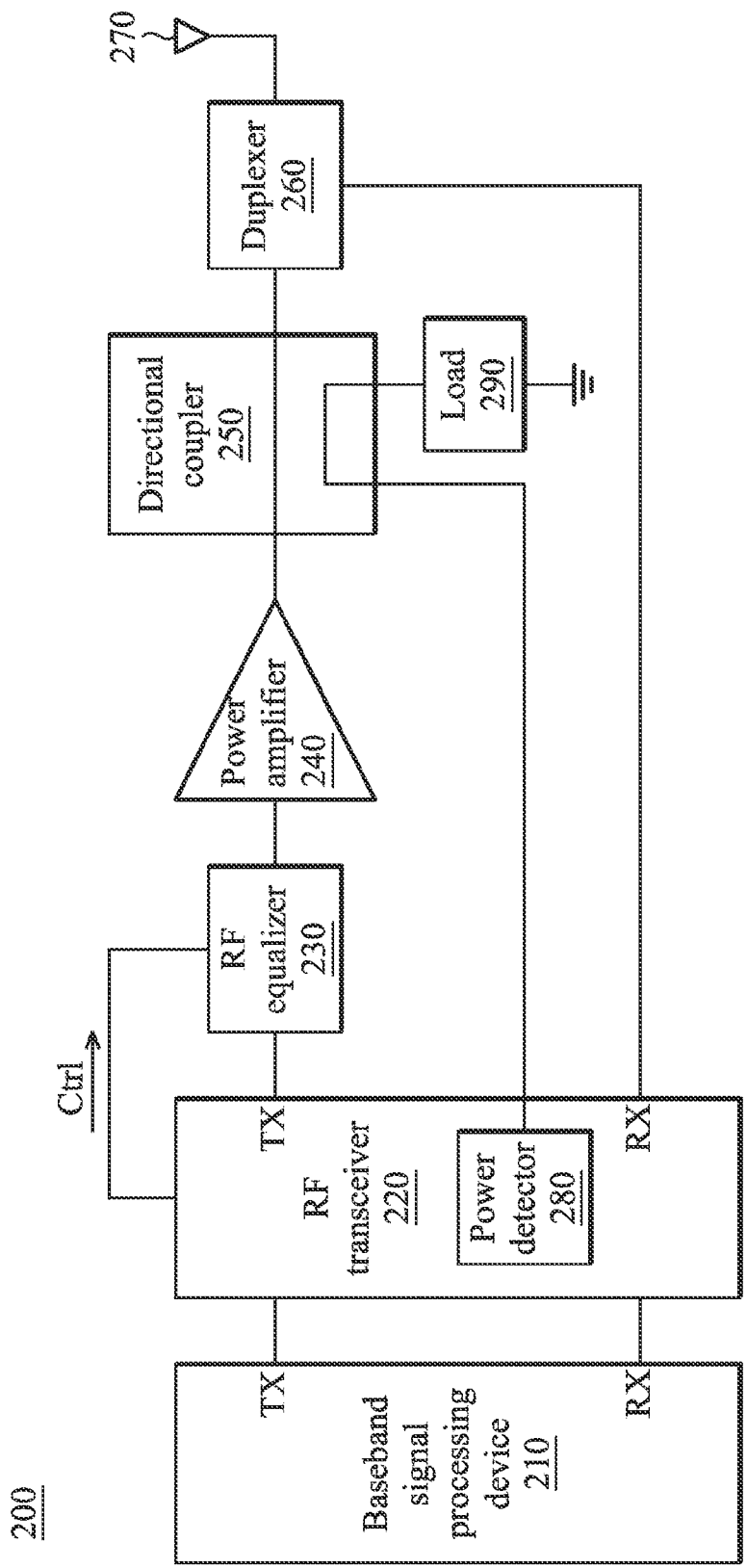
FIG. 2 shows a block diagram of a communications apparatus according to an embodiment of the invention.

FIG. 2 shows a block diagram of a communications apparatus according to an embodiment of the invention. The communications apparatus 200 may at least comprise a baseband signal processing device 210, a radio frequency (RF) transceiver 220, an RF equalizer 230, a power amplifier 240, a directional coupler 250, a duplexer 260 and an antenna 270. The baseband signal processing device 210 processes and generates baseband signals. The baseband signal processing device 210 may comprise a plurality of hardware devices for performing baseband signal processing, including analog to digital conversion (ADC)/digital to analog conversion (DAC), gain adjustment, modulation/demodulation, encoding/decoding, and so on. The baseband signal processing device 210 may further comprise a transmitting port TX for transmitting uplink signals and a receiving port RX for receiving downlink signals.

The RF transceiver 220 processes RF signals, such as receiving downlink RF signals and frequency down converting the RF signals to baseband signals for subsequent processing by the baseband signal processing device 210, or receiving uplink baseband signals from the baseband signal processing device 210 and frequency up converting the baseband signals to RF signals for subsequent transmissions. The RF transceiver 220 may comprise a plurality of hardware devices for performing the above-mentioned radio frequency conversion. For example, the RF transceiver 220 may comprise a mixer for multiplying the baseband signals and a carrier oscillated on a transmission frequency utilized by the mobile communications system together, where the transmission frequency may be 900 MHz, 1800 MHz or 1900 MHz for a GSM system, 900 MHz, 1900 MHz or 2100 MHz for a UMTS system, or 900 MHz, 2100 MHz or 2600 MHz for an LTE system, or others depending on the radio access technology in use.

The RF equalizer 230 is coupled to the RF transceiver 220 for receiving the uplink RF signals and generating a plurality of equalized RF signals according to a control signal Ctrl and the received uplink RF signals. According to an embodiment of the invention, the control signal Ctrl is generated by a power detector 280, for adjusting a frequency response of the RF equalizer 230, so that the communications apparatus 200 may compensate for unflatness of the output RF signal power via the RF equalizer 230 (the proposed RF equalizer 230 will further be discussed in the following paragraphs).

The power amplifier 240 is coupled to the RF equalizer 230 for receiving the equalized RF signals and amplifying the equalized RF signals to generate a plurality of amplified RF signals. The directional coupler 250 is coupled between the power amplifier 240 and the duplexer 260 for passing most of the amplified RF signals to the duplexer 260, and feeding a portion of the amplified RF signals back to the power detector 280. The directional coupler 250 may comprise an input port coupled to an output terminal of the power amplifier 240, an output port coupled to an input terminal of the duplexer 260, an isolated port coupled to a load 290 (usually a 50 ohm load) and a coupled port for feeding back a portion of the amplified RF signals.

The duplexer 260 is coupled to the power amplifier 240 through the directional coupler 250 for receiving the amplified RF signals and passing the amplified RF signals to the antenna 270. The amplified RF signals are finally transmitted to the air interface through the antenna 270. For downlink signal processing, the duplexer 260 receives downlink RF signals from the antenna 270 and transmits the received signal to the receiving port RX of the RF transceiver 220.

According to an embodiment of the invention, the power detector 280 detects the power of the amplified RF signals and generates the control signal Ctrl according to the power of the amplified RF signals. Note that the power detector 280 may be implemented as an independent and dedicated device, or may be integrated in the RF transceiver 220 as shown in FIG. 2, and the invention should not be limited to either way of implementation. In addition, when the power detector 280 is integrated in the RF transceiver 220, the power detector 280 may still be implemented as a dedicated device, or may be implemented by one element (for example, a processor) comprised in the RF transceiver 220, and the invention should not be limited to either way of implementation.

Figure 3:
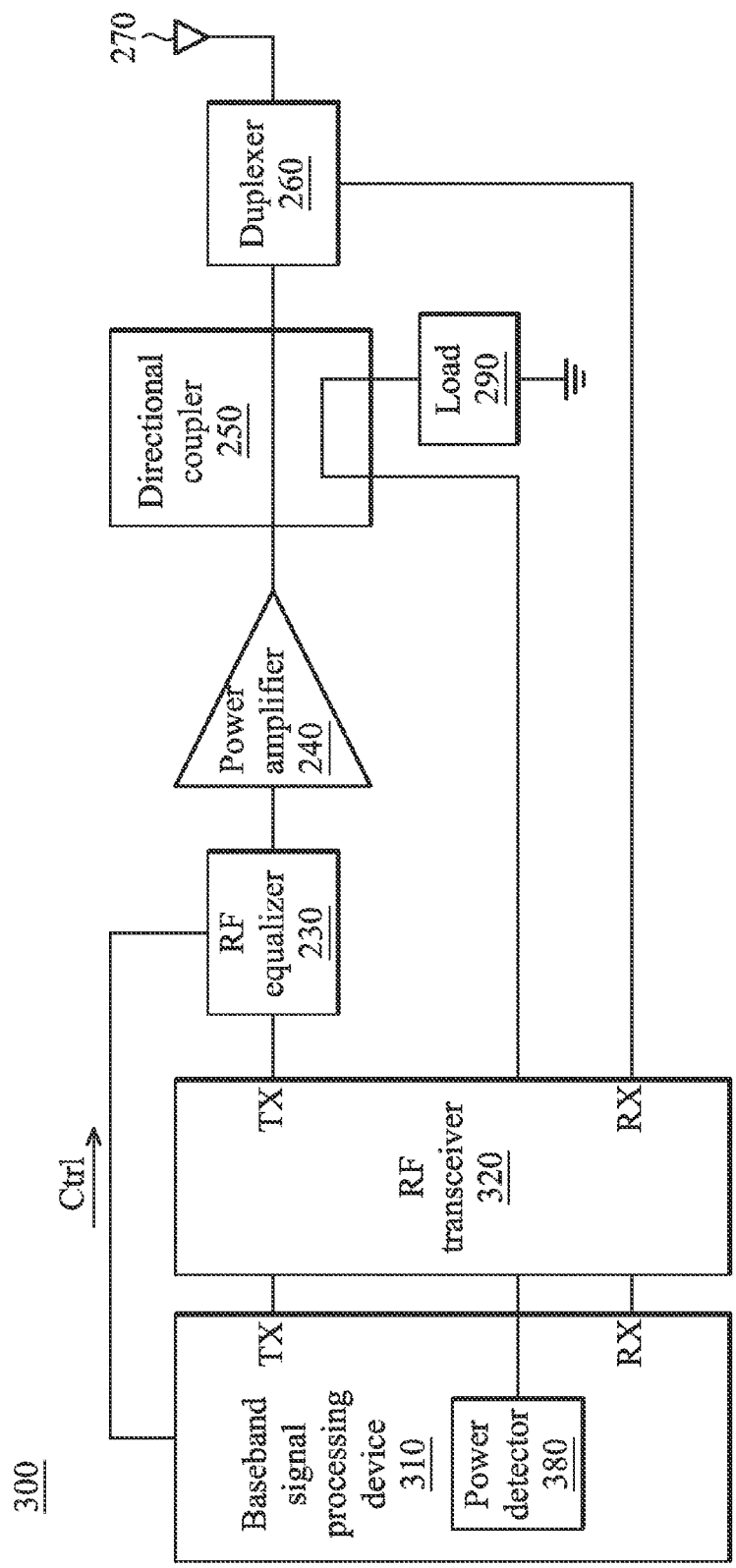
FIG. 3 shows a block diagram of a communications apparatus according to another embodiment of the invention.

According to another embodiment of the invention, the power detector may also be integrated in the baseband signal processing device. FIG. 3 shows a block diagram of a communications apparatus according to another embodiment of the invention. The communications apparatus 300 may at least comprise a baseband signal processing device 310, an RF transceiver 320, an RF equalizer 230, a power amplifier 240, a directional coupler 250, a duplexer 260 and an antenna 270. For the instructions of the baseband signal processing device 310, the RF transceiver 320, the RF equalizer 230, the power amplifier 240, the directional coupler 250, the duplexer 260 and the antenna 270, reference may be made to the descriptions related to FIG. 2, and are omitted here for brevity.

In the embodiment, the power detector 380 is integrated in the baseband signal processing device 310. The power detector 380 may still be implemented as a dedicated device, or may be implemented by one element (for example, a processor) comprised in the baseband signal processing device 310, and the invention should not be limited to either way of implementation. Note that in the embodiment, a portion of the amplified RF signals feedback by the directional coupler 250 may be directly passed to the power detector 380 for power detection, or may be passed to the RF transceiver 320 first for performing frequency down conversion and then passed to the power detector 380 for power detection, and the invention should not be limited to either way of implementation.

Figure 1B:
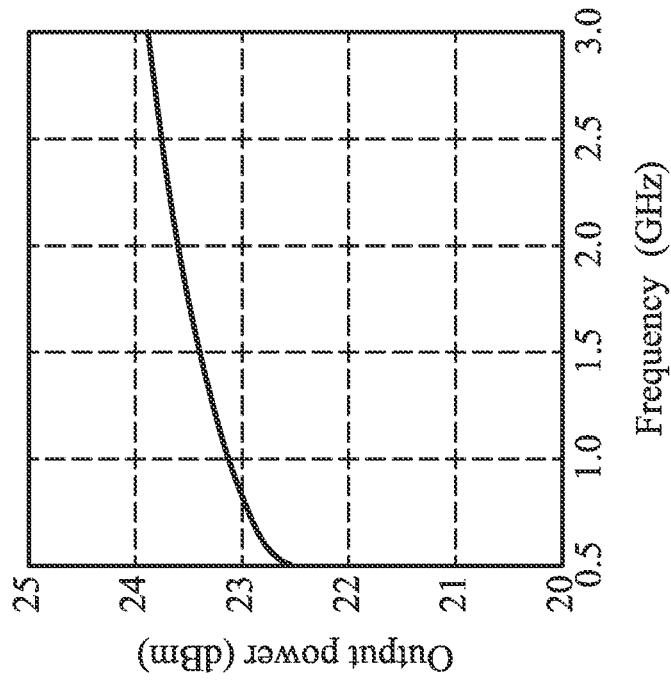
FIG. 1b shows another exemplary curve of output RF signal power versus frequency.
Figure 1A:
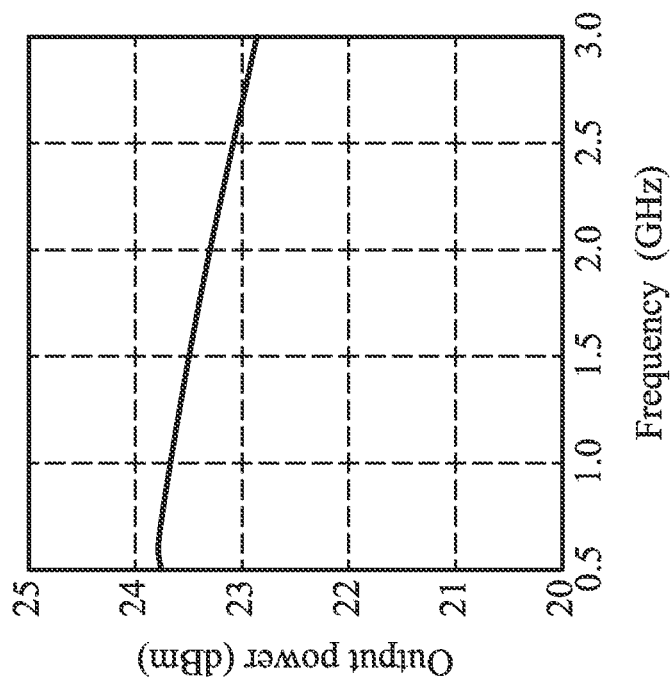
FIG. 1a shows an exemplary curve of output RF signal power versus frequency.

According to an embodiment of the invention, the power detector 280/380 is mainly used for detecting flatness of a curve representing the power of the amplified RF signals versus frequency. For example, the power detector 280/380 may record the power of the amplified RF signals after being amplified by the power amplifier 240 for different frequency bands (for example, different transmission bands utilized by different communications technologies, different transmission bands utilized by the same communications technology, or others), to obtain a curve (such as the curves as shown in FIG. 1a and FIG. 1b) representing the amplified RF signal power versus frequency. After obtaining the curve representing the power of the amplified RF signals versus frequency, the power detector 280/380 may further determine whether the amplified RF signals power decreases or increases as the frequency increases according to the curve, so as to generate a corresponding control signal Ctrl to adjust the frequency response of the RF equalizer 230.

Figure 4:
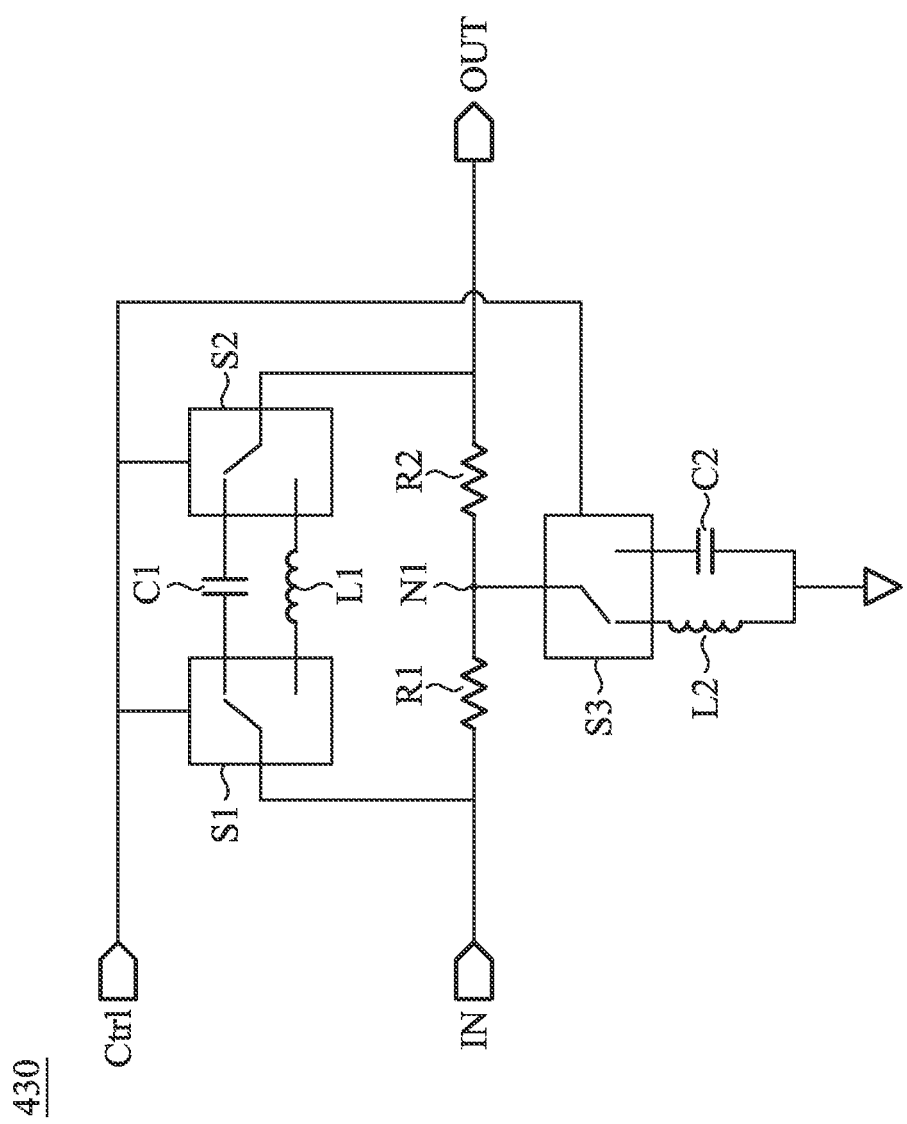
FIG. 4 shows a circuit diagram of the RF equalizer according to an embodiment of the invention.

FIG. 4 shows a circuit diagram of the RF equalizer according to an embodiment of the invention. The RF equalizer 430 may comprise resistors R1 and R2, capacitors C1 and C2, inductors L1 and L2, and switches S1, S2 and S3. The resistors R1 and R2 are coupled in serial between the input terminal IN and output terminal OUT of the RF equalizer 430. The switch S1 is coupled to the input terminal IN of the RF equalizer 430, the capacitor C1 and the inductor L1, for selectively coupling the capacitor C1 or the inductor L1 to the input terminal IN according to the control signal Ctrl. The switch S2 is coupled to the output terminal OUT of the RF equalizer 430, the capacitor C1 and the inductor L1, for selectively coupling the capacitor C1 or the inductor L1 to the output terminal OUT according to the control signal Ctrl. Therefore, in response to different states of the control signal Ctrl, one of the capacitor C1 and the inductor L1 may be coupled in parallel with the resistors R1 and R2 between the input terminal IN and the output terminal OUT. Similarly, the switch S3 is coupled to the resistors R1 and R2, the capacitor C2 and the inductor L2, for selectively coupling the capacitor C2 or the inductor L2 to a connection node N1 of the resistors R1 and R2 according to the control signal Ctrl.

Figure 5B:
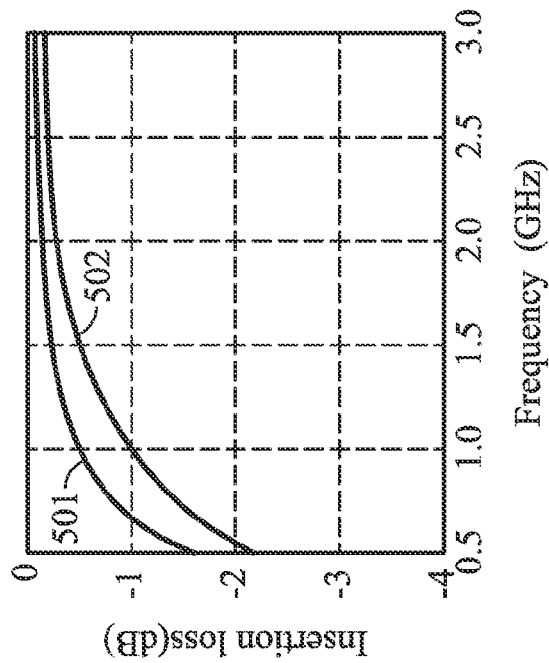
FIG. 5b shows a frequency response curve of the RF equalizer according to an embodiment of the invention.
Figure 5A:
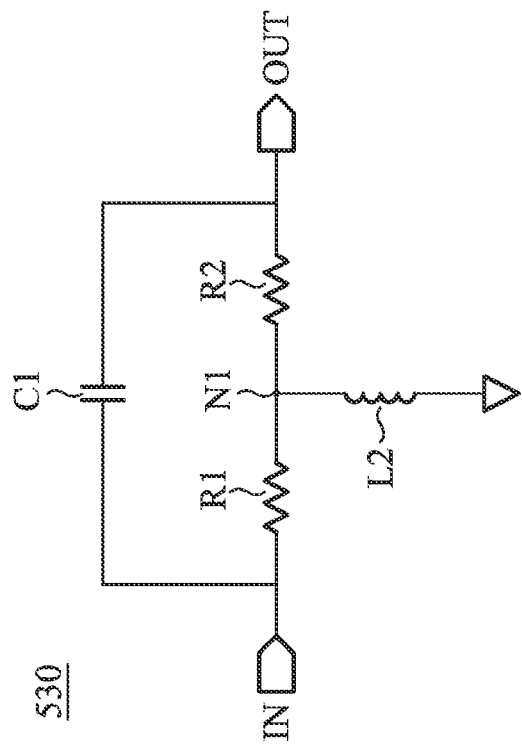
FIG. 5a shows an equivalent circuit diagram of the RF equalizer according to an embodiment of the invention.

According to an embodiment of the invention, when the power detector 280/380 detects that the power of the amplified RF signals decreases as the frequency increases (as the curve shown in FIG. 1a), the power detector 280/380 may set the control signal Ctrl to a first state (for example, a logic high state or a logic low state) so as to control the switch operations of the switches S1, S2 and S3, obtaining an equivalent circuit diagram of the RF equalizer as shown in FIG. 5a.

As shown in FIG. 5a, when the control signal Ctrl is in a first state, the equivalent circuit diagram of the RF equalizer 530 may comprise resistors R1 and R2, capacitor C1 and inductor L2. The capacitor C1 is coupled in parallel with the resistors R1 and R2 between the input terminal IN and the output terminal OUT. The inductor L2 is coupled between a node (for example, a ground node) and the connection node N1 of the resistors R1 and R2. Note that the inductor L1 is isolated from the input terminal IN and the output terminal OUT, and the capacitor C2 is isolated from the resistors R1 and R2.

FIG. 5b shows a frequency response curve of the RF equalizer according to an embodiment of the invention. The frequency response curve shown in FIG. 5b is the frequency response curve corresponding to the equivalent RF equalizer circuit shown in FIG. 5a. As shown in FIG. 5b, the frequency response of the equivalent circuit of the RF equalizer 530 is a curve where insertion loss decreases as the frequency is increasing. Therefore, when the power detector 280/380 detects that the power of the amplified RF signals has decreased as the frequency is increasing, the power detector 280/380 may set the control signal Ctrl to the first state, so as to compensate for the unflatness of the output power of the RF signals via the frequency equalizer 230.

Note that the capacitance of the capacitor C1 and the inductance of the inductor L2 may be adjusted according to the required slope of the frequency response, for achieving an optimal compensation result. According to an embodiment of the invention, a slope of the frequency response of the RF equalizer increases as a capacitance of the capacitor C1 and an inductance of the inductor L2 decrease. For example, as shown in FIG. 5b, the capacitance of the capacitor C1 and the inductance of the inductor L2 corresponding to the frequency response curve 502 are smaller than that corresponding to the frequency response curve 501.

Figure 6B:
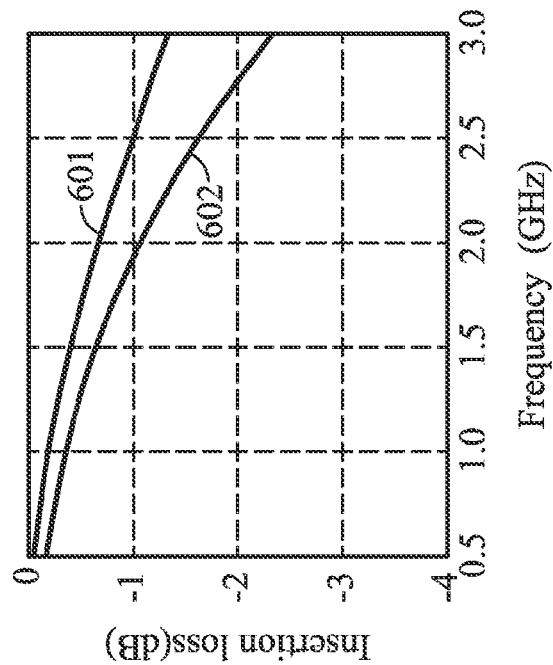
FIG. 6b shows a frequency response curve of the RF equalizer according to another embodiment of the invention.
Figure 6A:
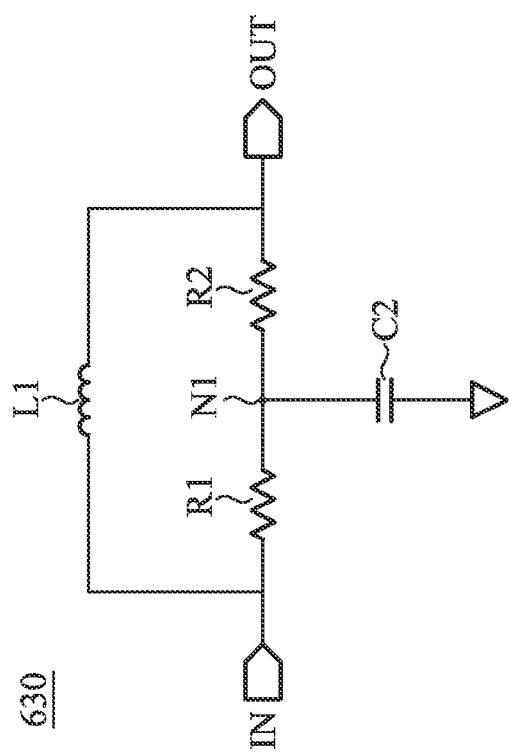
FIG. 6a shows an equivalent circuit diagram of the RF equalizer according to another embodiment of the invention.

According to another embodiment of the invention, when the power detector 280/380 detects that the power of the amplified RF signals increases as the frequency increases (as the curve shown in FIG. 1b), the power detector 280/380 may set the control signal Ctrl to a second state (for example, a logic low state or a logic high state) so as to control the switch operations of the switches S1, S2 and S3, obtaining an equivalent circuit diagram of the RF equalizer as shown in FIG. 6a.

As shown in FIG. 6a, when the control signal Ctrl is in a second state, the equivalent circuit diagram of the RF equalizer 630 may comprise resistors R1 and R2, capacitor C2 and inductor L1. The inductor L1 is coupled in parallel with the resistors R1 and R2 between the input terminal IN and the output terminal OUT. The capacitor C2 is coupled between a node (for example, a ground node) and the connection node N1 of the resistors R1 and R2. Note that the capacitor C1 is isolated from the input terminal IN and the output terminal OUT, and the inductor L2 is isolated from the resistors R1 and R2.

FIG. 6b shows a frequency response curve of the RF equalizer according to another embodiment of the invention. The frequency response curve shown in FIG. 6b is the frequency response curve corresponding to the equivalent RF equalizer circuit shown in FIG. 6a. As shown in FIG. 6b, the frequency response of the equivalent circuit of the RF equalizer 630 is a curve where insertion loss increases as the frequency is increasing. Therefore, when the power detector 280/380 detects that the power of the amplified RF signals has increased as the frequency is increasing, the power detector 280/380 may set the control signal Ctrl to the second state, so as to compensate for the unflatness of the output power of the RF signals via the frequency equalizer 230.

Note that the capacitance of the capacitor C2 and the inductance of the inductor L1 may be adjusted according to the required slope of the frequency response, for achieving an optimal compensation result. According to an embodiment of the invention, a slope of the frequency response of the RF equalizer increases as a capacitance of the capacitor C2 and an inductance of the inductor L1 increase. For example, as shown in FIG. 6b, the capacitance of the capacitor C2 and the inductance of the inductor L1 corresponding to the frequency response curve 602 are greater than that corresponding to the frequency response curve 601.

Figure 7:
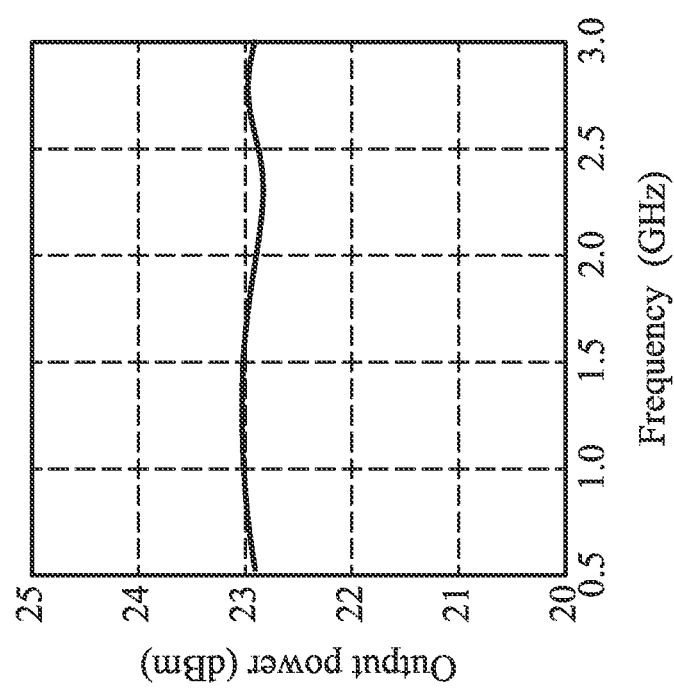
FIG. 7 shows a curve representing the power of the amplified RF signals, after the RF signals are equalized by the RF equalizer and amplified by the power amplifier, versus frequency according to an embodiment of the invention.

FIG. 7 shows a curve representing the power of the amplified RF signals, after the RF signals are equalized by the RF equalizer and amplified by the power amplifier, versus frequency according to an embodiment of the invention. As shown in FIG. 7, compared with FIG. 1a and FIG. 1b, by adjusting the frequency response of the RF equalizer in response to the control signal Ctrl according to the embodiments of the invention, flatness of the curve representing the power of the amplified RF signals versus frequency can be greatly improved and the unflatness problem can thus be solved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A communications apparatus, comprising:
 a radio frequency (RF) transceiver, receiving a plurality of baseband signals and generating a plurality of RF signals;
 an RF equalizer, coupled to the RF transceiver, receiving the RF signals and generating a plurality of equalized RF signals according to a control signal;

a power amplifier, coupled to the RF equalizer, receiving the equalized RF signals and amplifying the equalized RF signals to generate a plurality of amplified RF signals; and a duplexer, coupled to the power amplifier, receiving the amplified RF signals and passing the amplified RF signals to an antenna, wherein a frequency response of the RF equalizer is adjustable in response to the control signal.

2. The communications apparatus as claimed in claim 1, further comprising:

a power detector, detecting power of the amplified RF signals and generating the control signal according to the power of the amplified RF signals; and a directional coupler, coupled between the power amplifier and the duplexer for feeding a portion of the amplified RF signals back to the power detector.

3. The communications apparatus as claimed in claim 2, wherein the power detector is comprised in the RF transceiver.

4. The communications apparatus as claimed in claim 2, further comprising:

a baseband signal processing device, for processing and generating the baseband signals, wherein the power detector is comprised in the baseband signal processing device.

5. The communications apparatus as claimed in claim 1, wherein the RF equalizer comprises:

a first resistor, coupled to an input terminal;

a second resistor, coupled between the first resistor and an output terminal;

a first capacitor;

a first inductor;

a first switch, coupled to the input terminal, the first capacitor and the first inductor, selectively coupling the first capacitor or the first inductor to the input terminal according to the control signal;

a second switch, coupled to the output terminal, the first capacitor and the first inductor, selectively coupling the first capacitor or the first inductor to the output terminal according to the control signal;

a second capacitor;

a second inductor; and a third switch, coupled to the first resistor, the second resistor, the second capacitor and the second inductor, selectively coupling the second capacitor or the second inductor to a connection node of the first resistor and the second resistor according to the control signal.

6. The communications apparatus as claimed in claim 5, wherein a slope of the frequency response of the RF equalizer increases as a capacitance of the first capacitor and an inductance of the second inductor decrease.

7. The communications apparatus as claimed in claim 5, wherein a slope of the frequency response of the RF equalizer increases as an inductance of the first inductor and a capacitance of the second capacitor increase.

8. The communications apparatus as claimed in claim 2, wherein when the power detector detects that the power of the amplified RF signals decreases as frequency of the amplified RF signals increases, an equivalent circuit of the RF equalizer comprises:

a first resistor, coupled to an input terminal;

a second resistor, coupled between the first resistor and an output terminal;

a capacitor, coupled between the input terminal and the output terminal; and an inductor, coupled between a node and a connection node of the first resistor and the second resistor.

9. The communications apparatus as claimed in claim 2, wherein when the power detector detects that the power of the amplified RF signals increases as frequency of the amplified RF signals increases, an equivalent circuit of the RF equalizer comprises:

a first resistor, coupled to an input terminal;

a second resistor, coupled between the first resistor and an output terminal;

an inductor, coupled between the input terminal and the output terminal; and a capacitor, coupled between a node and a connection node of the first resistor and the second resistor.

10. The communications apparatus as claimed in claim 2, wherein the power detector generates the control signal to adjust the frequency response of the RF equalizer, so as to increase flatness of a curve representing the power of the amplified RF signals versus frequency of the amplified RF signals.

11. A radio frequency (RF) equalizer for receiving a plurality of RF signals and generating a plurality of equalized RF signals according to a control signal, comprising:

a first resistor, coupled to an input terminal;

a second resistor, coupled between the first resistor and an output terminal;

a first capacitor;

a first inductor;

a first switch, coupled to the input terminal, the first capacitor and the first inductor, selectively coupling the first capacitor or the first inductor to the input terminal according to the control signal;

a second switch, coupled to the output terminal, the first capacitor and the first inductor, selectively coupling the first capacitor or the first inductor to the output terminal according to the control signal;

a second capacitor;

a second inductor; and a third switch, coupled to the first resistor, the second resistor, the second capacitor and the second inductor, selectively coupling the second capacitor or the second inductor to a connection node of the first resistor and the second resistor according to the control signal.

12. The RF equalizer as claimed in claim 11, wherein when the control signal is in a state, the first capacitor is coupled between the input terminal and the output terminal, the first inductor is isolated from the input terminal and the output terminal, the second inductor is coupled between a node and the connection node of the first resistor and the second resistor, and the second capacitor is isolated from the first resistor and the second resistor.

13. The RF equalizer as claimed in claim 11, wherein when the control signal is in a state, the first inductor is coupled between the input terminal and the output terminal, the first capacitor is isolated from the input terminal and the output terminal, the second capacitor is coupled between a node and the connection node of the first resistor and the second resistor, and the second inductor is isolated from the first resistor and the second resistor.

14. The RF equalizer as claimed in claim 11, wherein a slope of a frequency response of the RF equalizer increases as a capacitance of the first capacitor and an inductance of the second inductor decrease.

15. The RF equalizer as claimed in claim 11, wherein a slope of a frequency response of the RF equalizer increases as an inductance of the first inductor and a capacitance of the second capacitor increase.

* * * * *